Dec. 12, 1950 E. L. ROSE 2,533,693
ROTARY PLOW
Original Filed April 30, 1945 2 Sheets-Sheet 1

Inventor
E. L. Rose
By
Kimmel & Crowell Attys.

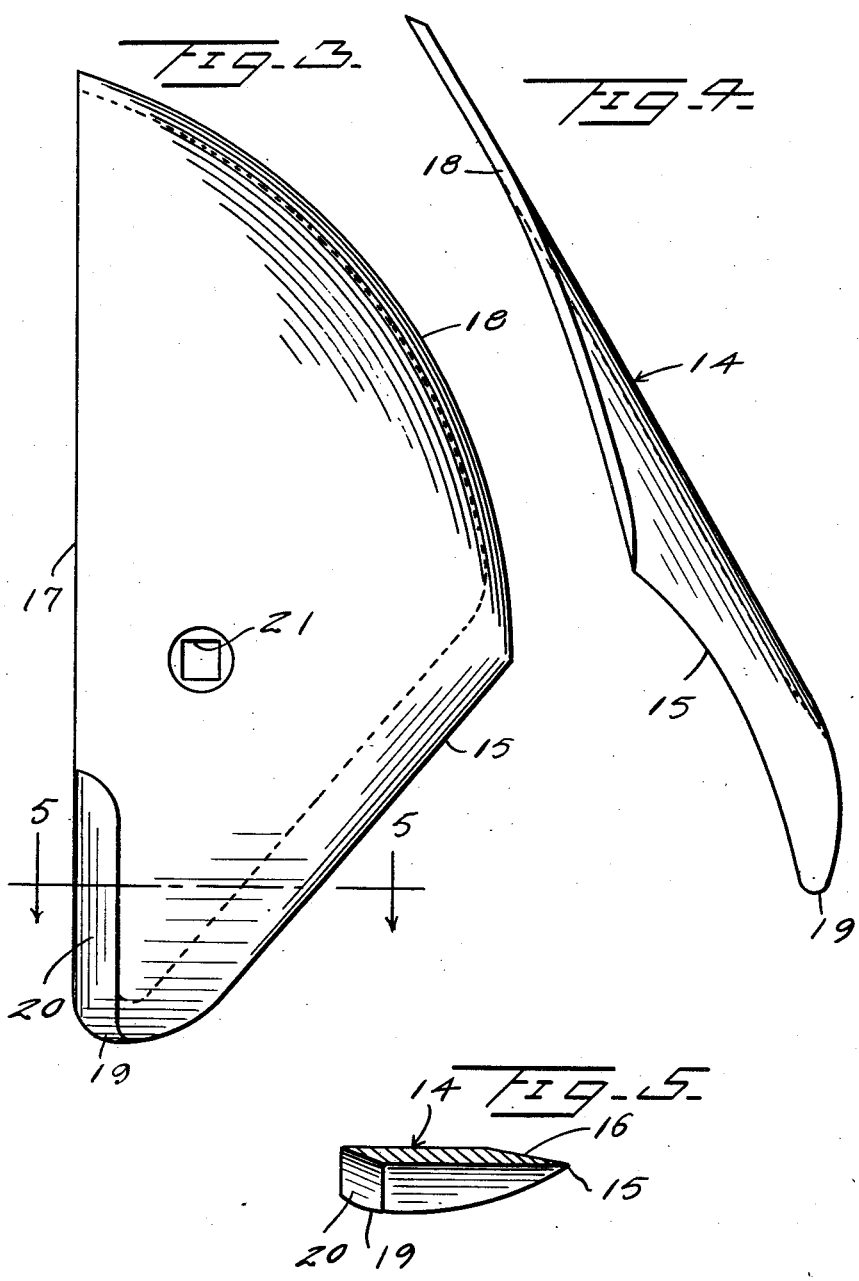

Patented Dec. 12, 1950

2,533,693

UNITED STATES PATENT OFFICE 2,533,693

ROTARY PLOW

Eustace Loring Rose, Dunbar, W. Va., assignor to Gravely Motor Plow and Cultivator Company, Dunbar, W. Va.

Original application April 30, 1945, Serial No. 590,994. Divided and this application February 9, 1948, Serial No. 7,072

2 Claims. (Cl. 97—212)

This invention relates to rotary plows and is a division of my copending application Serial No. 590,994, filed April 30, 1945, for Rotary Plow.

An object of this invention is to provide a rotary plow structure which includes a hub and radially disposed arms on which are mounted segmental plow blades which are inclined to the vertical and are adapted upon rotation thereof to pulverize the dirt and throw the loose dirt laterally of the line of travel.

Another object of this invention is to provide a plow structure of this kind which is so constructed and arranged that the plow may be operated with the hub either vertical or at an inclination to the vertical, so that if desired ditches of different shapes may be formed, or the dirt may be thrown and scattered to one side of the plow so as to thereby form a smooth plowed surface which will not require harrowing or other treatment.

A further object of this invention is to provide a rotary plow which includes a spider-like hub having secured to the arms thereof sector-shaped blades having upturned leading edges and the blades being mounted on an angle to the vertical.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 3 is a bottom plan of one of the plow blades.

Figure 4 is a front edge view of one of the blades.

Figure 5 is a fragmentary sectional view taken on the line 5—5 of Figure 3.

Figure 1:
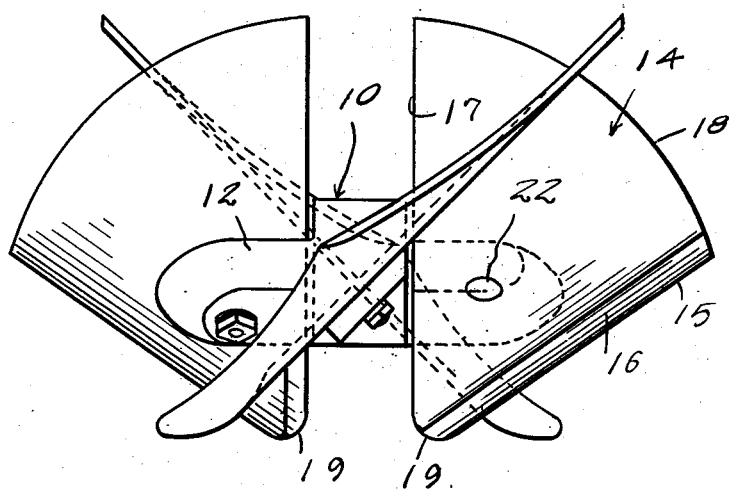
Figure 1 is a detailed side elevation of a rotary plow constructed according to an embodiment of this invention.
Figure 2:
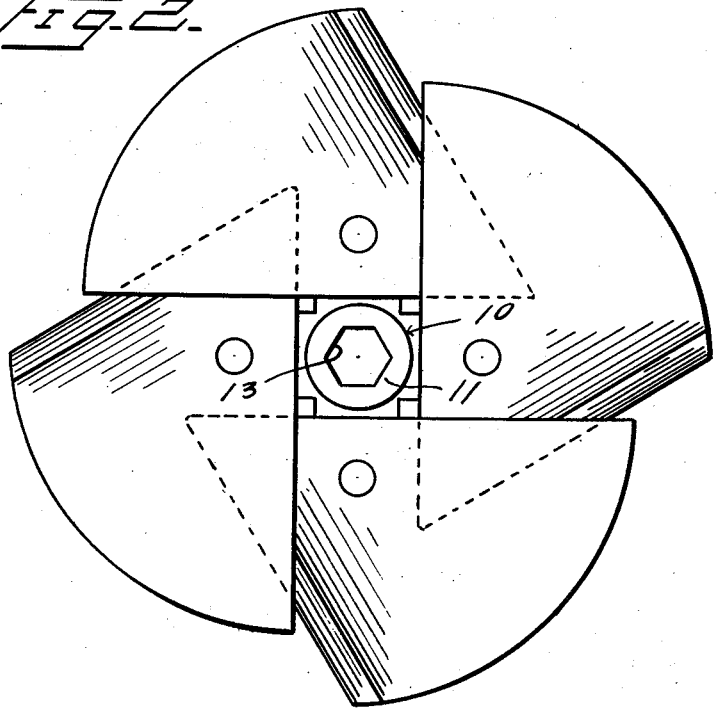
Figure 2 is a top plan view of the plow.

Referring to the drawings, the numeral 10 designates generally a spider member which is formed of a hub 11 having a polygonal bore 13 therethrough. The hub 11 has extending radially therefrom a plurality of arms 12 which have inclined upper faces and on which are mounted sector-shaped plow blades generally designated as 14. Each plow blade 14 is formed of a sector-shaped plate having an upturned leading edge 15 which is beveled as indicated at 16. The plow blade 14 also includes a trailing edge 17 which is substantially longer than the leading edge 15 and the outer edge 18 of each blade 14 is formed on an arc. The junction between the leading and trailing edges 15 and 17, respectively, is formed in a rounded nose 19 which as shown in Figure 4 is upturned and the blade 14 on the rear side thereof is formed with a bevel 20 extending upwardly along the trailing edge 17.

The blade 14 is formed with a polygonal opening 21 through which a fastening member 22 is adapted to engage for securing the blade to an arm 12. Each blade 14 is inclined to the vertical when positioned on a supporting arm 12 and this plow blade structure may be used with the longitudinal axis of the bore 13 either vertical or at an inclination to the vertical.

Where a substantially V-shaped ditch is to be formed, the axis of the hub 11 may be disposed in a vertical position. Where the dirt is to be pulverized and thrown laterally of at least one side of the line of travel, the plow structure may be inclined to the vertical to the extent that the leading edge 15 will be in substantially a horizontal position.

In the use of this plow structure the hub 11 is secured to a shaft having the polygonal end portion so that the hub 11 will be held against rotation relative to the shaft. Upon rotation of the plow structure the dirt will be substantially pulverized and will be thrown upwardly and outwardly. Where it is desired merely to pulverize the dirt, a suitable shield may be disposed about at least a portion of the area formed by the plow so that the dirt will be thrown to only one side of the line of travel. Where a V-shaped ditch such as an irrigation ditch or the like is to be formed, the plow structure is mounted in substantially a vertical position with respect to the axis of the hub 11. With a plow structure as hereinbefore described the dirt will be readily pulverized and loosened so that it will not be necessary to work over the ground a second time with a harrow, rake or other implement as is the case with a conventional plow.

I claim:

1. A rotary plow comprising a hub, a plurality of radial arms fixed to said hub and each formed with a surface inclined to the vertical, a sector shaped plow blade fixed to each of said arms on the inclined surface thereof, each of said blades being disposed with its narrow end lowermost and its inner edge lying within a vertical plane tangential to said hub and the outer edge inclined inwardly and formed with a beveled edge to provide a cutting edge.

2. A rotary plow comprising a hub, a plurality of radial arms fixed to said hub and each formed with the upper surface thereof inclined to the vertical, a sector shaped plow blade fixed to each of said arms on the inclined upper surface thereof, each of said blades being disposed with the apex thereof lowermost and the inner edge lying within a vertical plane, the inwardly inclined outer edge of each of said blades being beveled to provide cutting means, said blades being formed concave longitudinally and upwardly.

EUSTACE LORING ROSE.

REFERENCES CITED

The following references are of record in the file of this patent:

UNITED STATES PATENTS

| Number | Name | Date |
|---|---|---|
| 416,880 | Whitehead | Dec. 10, 1889 |
| 554,117 | Franzen et al. | Feb. 4, 1896 |
| 768,106 | Williams | Aug. 23, 1904 |
| 1,119,862 | Nilson et al. | Dec. 8, 1914 |

FOREIGN PATENTS

| Number | Country | Date |
|---|---|---|
| 20,259 | Great Britain | of 1901 |